Oct. 2, 1956      A. W. KATH      2,764,863
CAPSULE FILLING MACHINE

Filed Oct. 5, 1953      6 Sheets-Sheet 1

INVENTOR.
ALFRED W. KATH

BY *George R. Ordway.*

ATTORNEYS

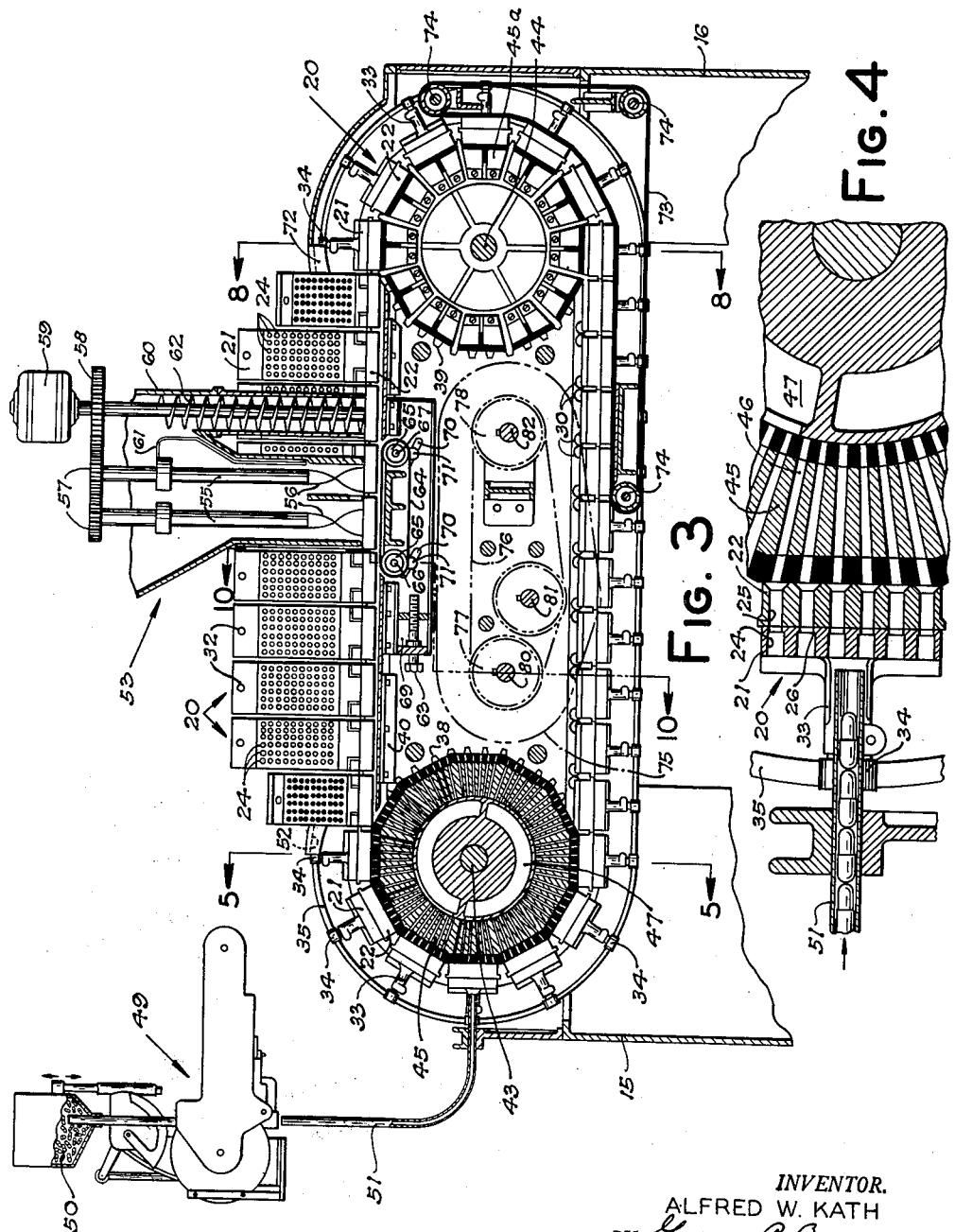

Oct. 2, 1956 A. W. KATH 2,764,863
CAPSULE FILLING MACHINE
Filed Oct. 5, 1953 6 Sheets-Sheet 3

INVENTOR.
ALFRED W. KATH
BY George A. Ordway.
ATTORNEYS

INVENTOR.
ALFRED W. KATH
BY George A. Ordway.
ATTORNEYS

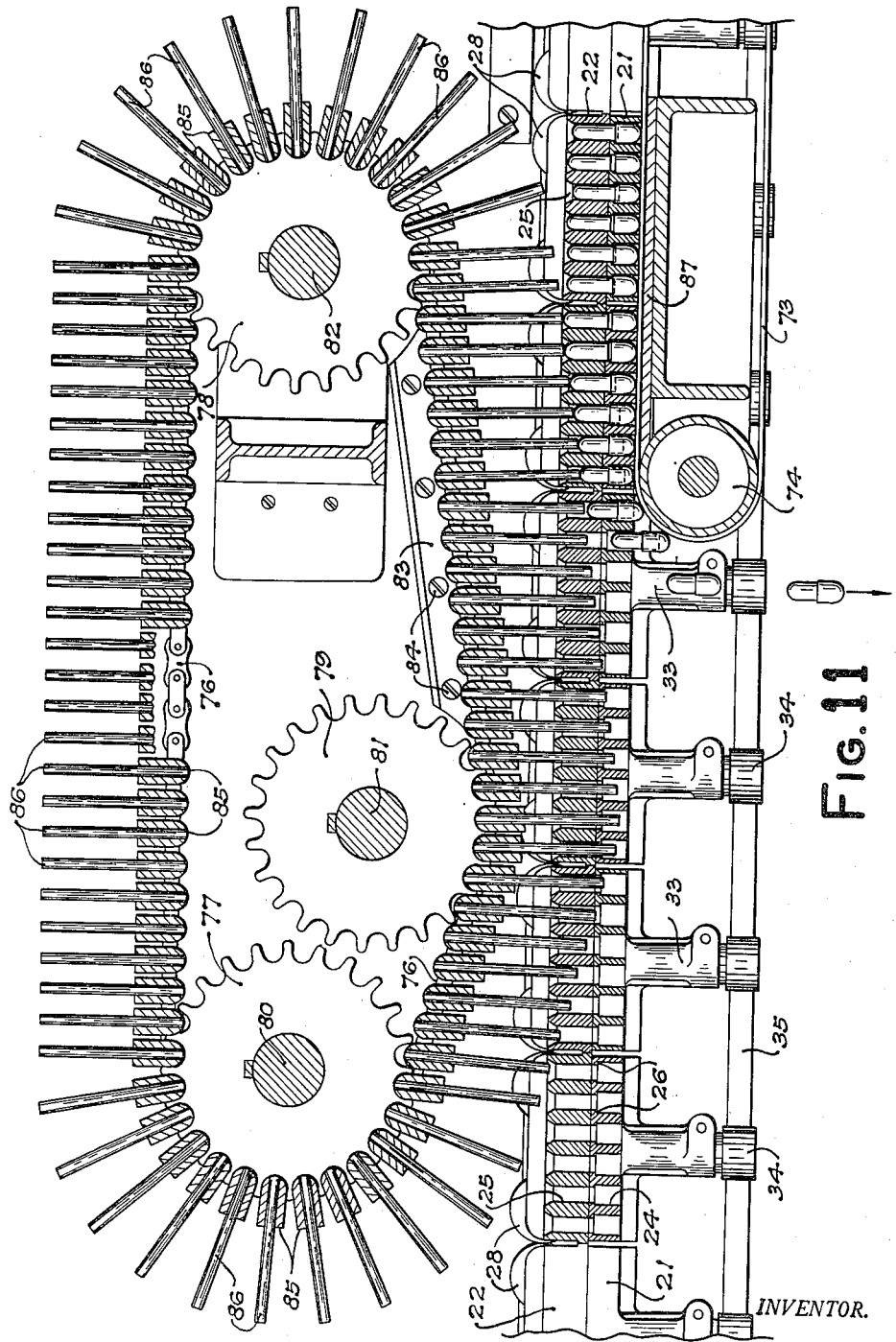

United States Patent Office 2,764,863
Patented Oct. 2, 1956

2,764,863

CAPSULE FILLING MACHINE

Alfred W. Kath, Cleveland, Ohio, assignor to Eli Lilly and Company, Indianapolis, Ind., a corporation of Indiana Application October 5, 1953, Serial No. 384,011

9 Claims. (Cl. 53—282)

This invention relates to capsule filling machines and more particularly to an automatic machine for filling capsules of the telescoping, separable, cap and body type.

A general object of the invention is to provide in a machine of this character a capsule filling mechanism that is operable continuously, is free of intermittent movements and that progressively and smoothly performs upon multiple groups of capsules all of the required operations of separation, filling, rejoining and ejection in a smooth, facile and expeditious manner.

Another object is to provide a capsule handling mechanism for a machine of this character which is operative in such manner as to prevent the application of any undue strains or forces upon the capsules during their passage through the machine to and past the operation performing stations.

A still further object is to provide in a machine of this character a construction and mode of operation which affords great latitude for visual inspection of the separated cap and body capsule components and facile replacement of any defective parts preparatory to their being presented to the filling station.

A further object is to provide an improved arrangement and mode of operation capable of performing independent and individual rejoining of the capsule bodies within their respective caps following the capsule filling operation.

With these and other incidental objects in view, the invention comprises certain novel features of construction and combinations of parts, the essential elements of which are set forth in appended claims, and a preferred embodiment of which is hereinafter described with reference to the drawings which accompany and form part of the specification.

Figure 5:
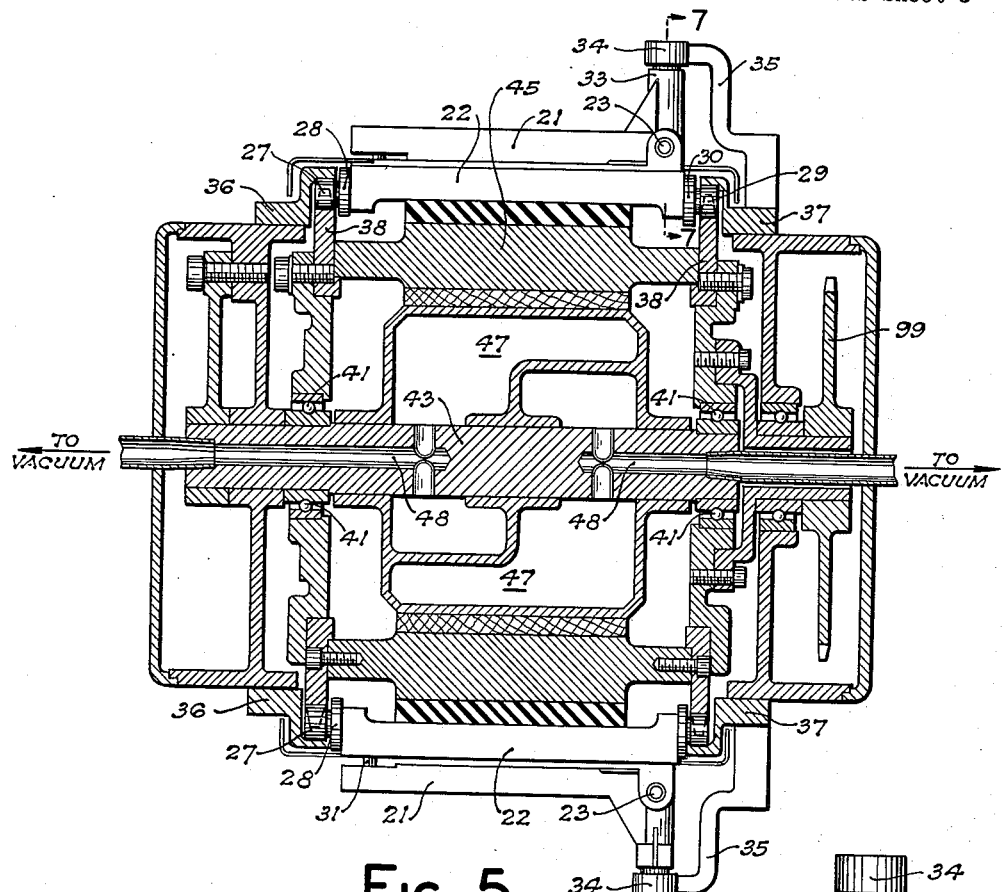
Figure 6:
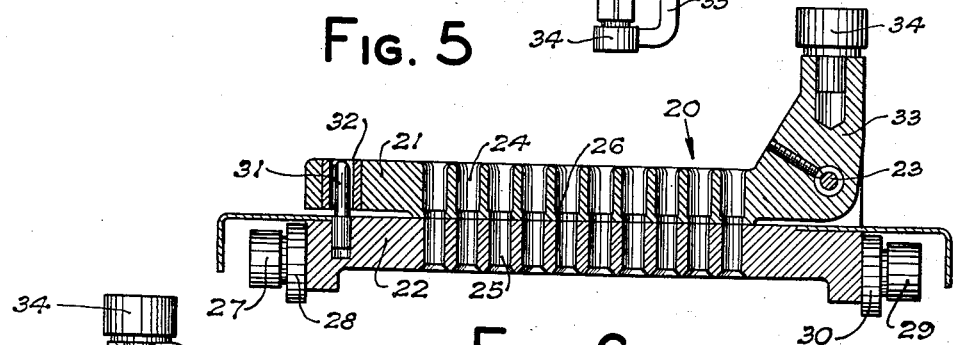
Figure 7:
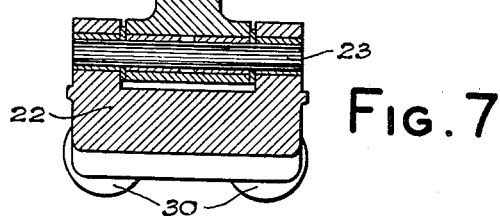
Figure 8:
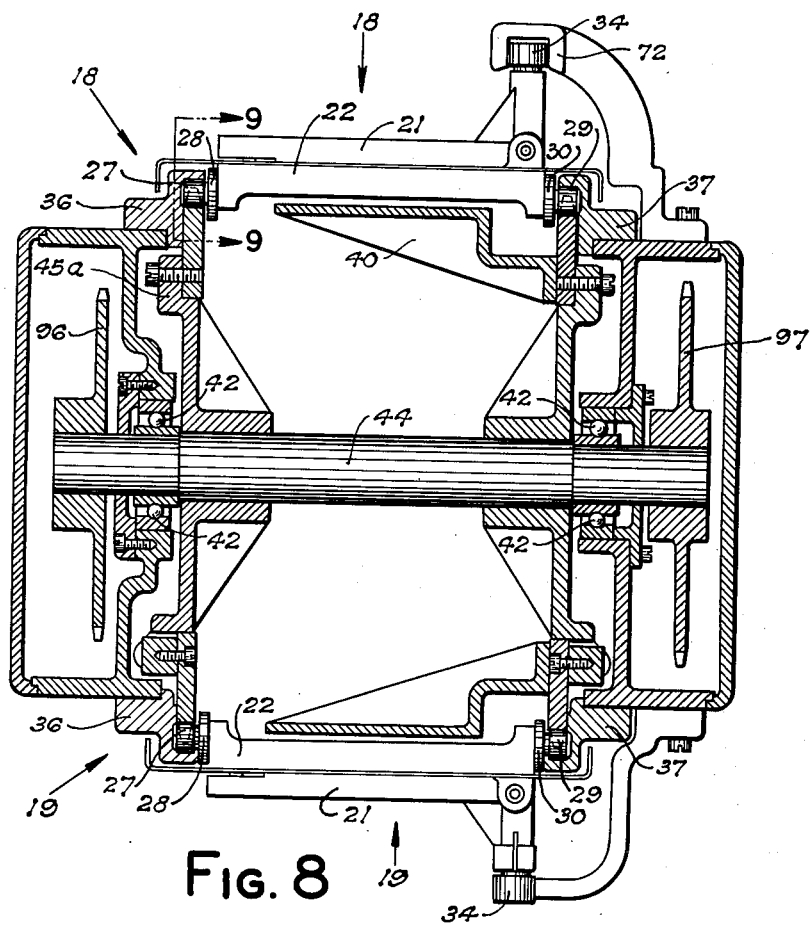
Figure 9:
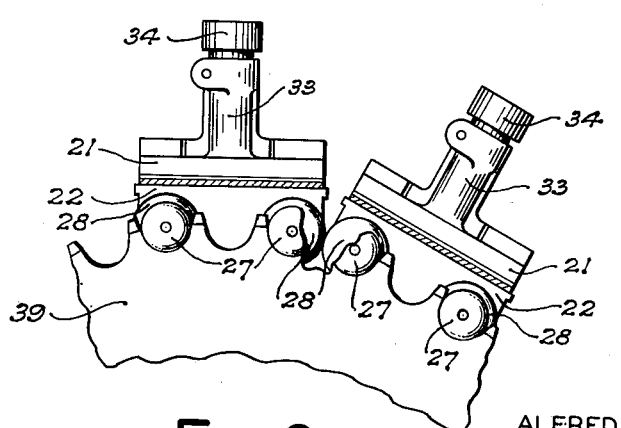
Figure 10:
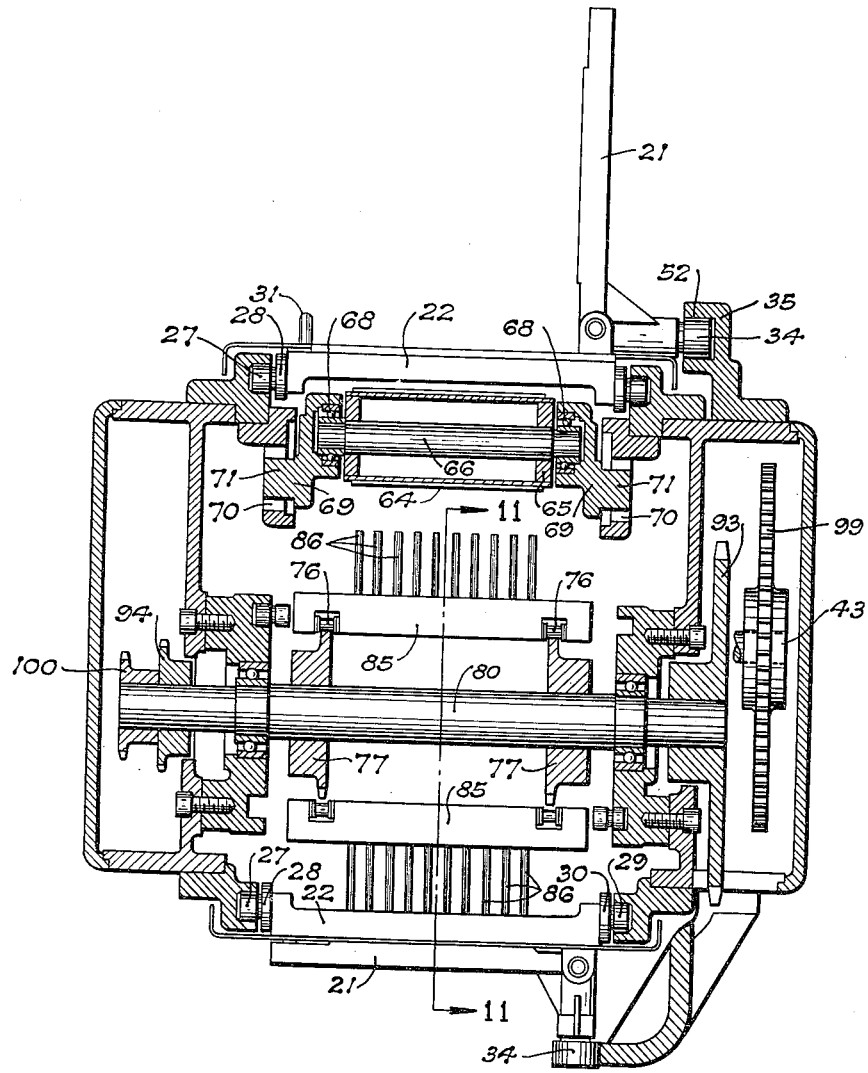

Fig. 3 is a sectional elevation taken substantially along the longitudinal center line of the machine, Fig. 4 is a detailed, enlarged sectional view of a portion of the capsule feeding station of the machine, Fig. 5 is a sectional elevation taken along the line 5—5 of Fig. 3, Fig. 6 is a detailed sectional elevation of one of the capsule-part receiving units, Fig. 7 is a sectional elevation taken along the line 7—7 of Fig. 5, Fig. 8 is a sectional elevation taken along the line 8—8 of Fig. 3, Fig. 9 is a sectional view taken along the line 9—9 of Fig. 8, Fig. 10 is a sectional elevation taken along the line 10—10 of Fig. 3, and Fig. 11 is a sectional elevation taken along the line 11—11 of Fig. 10.

Figure 1:
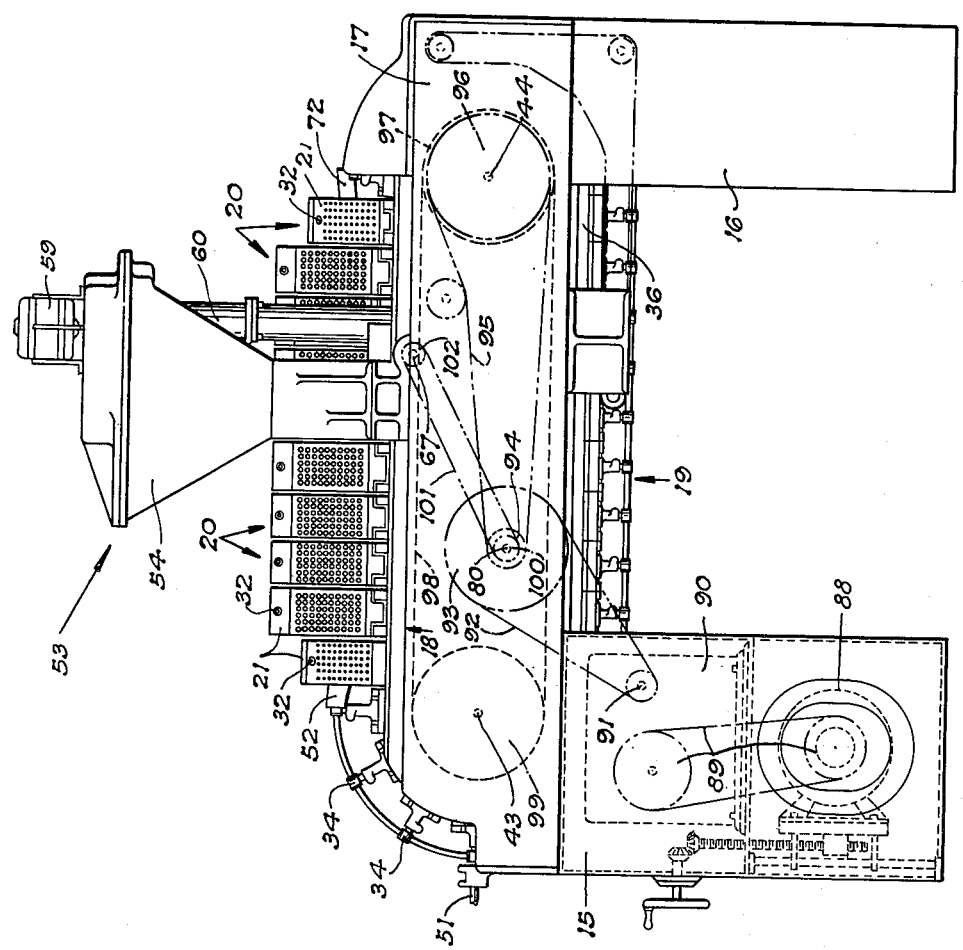
Fig. 1 is a front elevation of the improved capsule filling machine.

Referring to Fig. 1, the machine includes two upright, spaced, hollow pedestals 15 and 16 upon which are mounted a horizontally disposed enclosed bed 17. Bed 17 substantially contains a conveyor having upper and lower stretches indicated generally at 18 and 19, respectively. The conveyor includes an endless series of disconnected, capsule-part receiving units indicated generally at 20.

Referring to Fig. 6, each unit 20 comprises a pair of capsule cap and body carrier plates 21 and 22, respectively. Plates 21 are mounted in superposed relation upon capsule body-receiving plates 22 and are hinged at the rear end thereof, as at 23, to said body plates so that the cap-carrier plates can be swung arcuately about their hinged connections from their closed position, as shown in Fig. 6, upwardly into open position as shown in Fig. 10. Plates 21 and 22 are each provided with a series of aligned, vertically disposed capsule cap and body receiving apertures 24 and 25, respectively, each aperture 24 being shouldered in the usual manner, as at 26, to provide an abutment or stop for the lower edges of the capsule caps as the capsules are sucked into seated position and the bodies separated from the caps as will hereinafter be described. The forward end of each plate 22 has journaled for rotation thereon a pair of spaced rollers 27, each roller having an enlarged portion 28. Similarly the rear end of each plate 22 has journaled thereon a pair of similarly spaced, stepped, rollers 29 having enlarged portions 30 formed thereon.

A piloting and locating stud 31 is affixed in the upper surface of each plate 22 to receive with slight clearance an aperture 32 provided adjacent the forward edge of plate 21. In this manner, apertures 24 and 25 are registered positively in mutual, vertical, axial alignment when plate 21 rests in its closed position upon plate 22 as shown in Fig. 6. Each upper plate 21 has an upstanding arm 33 formed integrally adjacent its rear end on which is rotatably journaled a cam roller 34 arranged for cooperative association with a cam track 35 later to be described.

Upper and lower stretches 18 and 19 of the conveyor are formed of spaced pairs of inwardly facing, channeled tracks 36 and 37 (Figs. 1 and 8) suitably affixed to the frame of bed 17, the channels of the tracks being of such height and depth as to receive with slight clearance rollers 27 and 29 of body plates 22.

A pair of spaced, toothed sprockets 38 (Figs. 3 and 5) are aligned with and interconnect the upper and lower tracks of the conveyor at the left side of the machine as viewed in Fig. 3, and a similar pair of spaced, toothed sprockets 39 (Fig. 8) similarly connect the upper and lower stretches of the conveyor at the right side of the machine thereby completing the endless path around which carriers 20 travel.

Referring to Fig. 9, it will be seen that the arrangement is such that alternate pairs of teeth of sprockets 38 and 39 engage rollers 27 and 29 and thus transfer the carriers 20 in an endless series from the upper stretch 18 to the lower stretch 19 in a clockwise direction as viewed in Fig. 3, and thence upwardly from the lower stretch 19 back to the upper stretch as sprockets 38 and 39 are driven in rotation in a manner later to be described.

The enlarged portions 28 and 30 of the stepped rollers 27 and 29, respectively, are preferably of such diameter as to contact each other tangentially and thus establish uniform spacing and impart a pushing movement from one carrier 20 to the next during the advance of the carriers along the upper and lower stretches, the teeth of the sprockets moving the carriers around the 180° outer turns of sprockets 38 and 39. Transversely extending bed plates 40 (Figs. 3 and 8) are affixed to the frame of bed 17 and to the rearmost sprocket 39 in position to underlie capsule body plates 22 for retaining the capsule bodies therewithin. Sprockets 38 and 39 are suitably bearingjournaled, as at 41 and 42, respectively, upon transversely extending shafts 43 and 44, respectively (Figs. 3, 5, and 8). A drum 45 in the shape of a dodecahedron is mounted on shaft 43 between sprockets 38 and a drum 45a of similar shape is mounted on shaft 44 between sprockets 39. The twelve segments composing drum 45 each are provided with a series of bores 46 (Fig. 4) communicating between apertures 25 and recesses 47 formed interiorly of the drum which, in turn, communicate through ports 48 (Fig. 5) with a source of vacuum (not shown).

Referring now particularly to Fig. 3, the capsules are fed to the carriers 20 in uprighted condition by a capsule selector and rectifying mechanism indicated generally at 49. This mechanism may be and preferably is of the character such as is fully disclosed in my co-pending U. S. patent application Serial No. 331,873 and generally comprises a hopper 50 in which a supply of capsules are placed in random arrangement and a rectifying mechanism is adapted to select, rectify, and feed the capsules into a plurality of tubes such as 51. It will be understood that other types of capsules rectifying and feeding mechanisms may be used if desired. Tubes 51 deliver the capsules with their bodies foremost into the cap receiving apertures 24 of a carrier unit 20. The suction from the vacuum line (not shown) operating through ports 48, recesses 47, and bores 46 pulls the capsules into the carriers and thus separates the bodies from the caps as the inner edges of the latter abut against shoulders 26, the bottoms of the bodies coming to rest against the outer surfaces of the respective segments constituting drum 45. As carriers 20, with their apertures filled with separated capsules, advance clockwise around the conveyor by the rotation of sprockets 38, cam rollers 34 of the respective carriers, one after another, enter within the confines of a channeled portion 52 (Figs. 1 and 10) of cam track 35. Such entrance, almost immediately, cams plates 21 arcuately, upwardly from the closed positions shown in Fig. 6 to the open positions shown in Fig. 10.

Referring to Fig. 3, it will be seen with reference particularly to the lefthand upper portion of this figure, that the arcuate, upward movement above described occurs in a relatively short span of travel of one of the capsule carrier units 20. In consequence, a space corresponding to the width of substantially five carrier units exists wherein cap plates 21 are in a 90° vertical position with respect to the body plates 22. This affords ample opportunity for and facilitates the removal and replacement of any defective capsule parts in their respective apertures. It further allows the operator a maximum amount of time in which to effect manual separation of capsule parts in instances where such separation, perchance, has inadvertently or otherwise failed incident to the ingress of capsules into carriers 20, and to do this before the exposed open upper ends of the bodies are presented to the filling mechanism generally indicated at 53 and now to be described.

The filling mechanism comprises a sloping bottomed hopper 54 (Fig. 1) in which the medicament or other substance with which the capsules are to be filled is contained. Vertically disposed shafts 55 (Fig. 3) suitably journaled for rotation within hopper 54 are provided at their lower ends with augers 56, the lower ends of which rest immediately above the upper surfaces of apertures 25 of body plates 22. The upper ends of shafts 55 are interconnected by gears 57 with a driving gear 58 affixed to an electric motor 59. Immediately adjacent hopper 54 and extending through a suitable housing 60, integrally formed with the hopper, there is provided a helical feed screw 62 which is also connected through gear 58 with motor 59. As motor 59 drives augers 56 in rotation, the capsule filling material is forced from hopper 54 downwardly into the capsule body parts contained within the apertures 25 of plates 22. As the carriers advance from under augers 56, any excessive filling material which might be resting on the upper surface of a plate 22 is swept up by the lower convolution of helical screw 62 and is elevated by the tiers of the screw back into the supply source within the upper portion of hopper 54. If desired, agitators such as 61 may be affixed to shafts 55 to insure maintenance of a free flow of the filling material.

Referring now to Fig. 3, immediately beneath the lower surfaces of plates 22 and in vertical alignment with augers 56, there is provided a relatively short, endless, driven belt 64 extending horizontally over and around spaced rollers 65 (see also Fig. 10) fixed upon horizontally disposed shafts 66 and 67 suitably journaled at their opposite ends as at 68 (Fig. 10) in a sub-frame 69. Frame 69 is mounted by diagonally disposed slots 70 and suitable projections 71 for sliding movement to the right or to the left as viewed in Fig. 3. A suitable means such as screw 63 (Fig. 3) is provided for imparting an adjusted, incremental movement either to the right or to the left to sub-frame 69 whereby belt 64 may be either raised or lowered bodily a slight amount to govern elevation of the capsule bodies with respect to the upper surfaces of plates 22 and thus control the quantum of filling. By having the support for the capsules movable with the capsules at this critical filling point, as by this traveling belt means, chances of deformation to or injury upon the capsule parts is materially lessened since the movement of the support is in the direction of travel of the capsules and counteracts such increased resistance as exists incident to the friction created by downward pressure upon the filling material and capsule bodies by augers 56 as the bodies pass thereunder.

Referring to Figs. 3 and 8, shortly following the filling operation rollers 34 are engaged by a channeled portion 72 of cam track 35, similar to channeled portion 52, but effective to rapidly lower the upper cap-carrying plates 21 back into closed position with respect to their associated body-carrying plates 22 in readiness for the capsule caps to be rejoined upon the filled capsule bodies. That portion of cam track 35 which interconnects channeled portions 52 and 72 continuously engages rollers 34 and is effective to maintain the cap carriers 21 in closed relation with respect to their associated body plates 22.

Following the closure of carrier units 20, they are advanced by drum 45a and gears 39 through an 180° arc into the lower stretch 19 of the conveyor. An endless belt 73 mounted tautly over horizontally disposed rollers 74, suitably journaled in the machine frame, is arranged to engage the outer surfaces of cap-carrier plates 21 and retain the filled capsules within their respective receiving apertures 24 and 25 as the carriers pass through the lower quadrant of the arc and also to retain the capsules within the confines of their receiving apertures for a substantial distance of their traverse along the lower stretch 19 of the conveyor. Belt 73 is under sufficient tension so that its frictional engagement with the cap carrier plates in their conformation to the dodecahedrally shaped drum 45a, as clearly illustrated in Fig. 3, causes the belt to be driven in movement as carriers 20 are advanced by sprockets 39 and drum 45a.

As the capsule carriers proceed into the lower stretch 19 of the conveyor, the mechanism, generally indicated at 75 (Fig. 3), for rejoining the bodies with the caps becomes effective to perform this operation. This mechanism is best shown in Figs. 10 and 11 and includes a pair of endless chains 76 engaging and passing around a pair of spaced sprockets 77 and 78 and an idler sprocket 79 fixed to horizontally disposed shafts 80, 81 and 82, respectively, suitably journaled for rotation within bed 17 of the machine frame. Idler sprocket 79 is disposed at a plane slightly below the plane of sprockets 77 and 78 so that chains 76 have a slight inclination downwardly toward the lower stretch 19 of the conveyor, the lower stretch of the chain, for the extent of this incline, passing beneath an inclined backing guide 83 secured as by screws 84 to the machine frame. A series of transversely extending, horizontally disposed bars 85 are affixed at predetermined, spaced points between chains 76, the spacing between the centers of such bars corresponding to the spacing between the centers of the cap and body receiving apertures 24 and 25. Each bar 85 carries a series of outwardly projecting capsule-closing pins 86, there being one pin for each aperture in each transverse row of cap and body receiving apertures in the carrier units 20.

Referring to Fig. 11, it will be seen that just beneath the upper stretch of belt 73 where it terminates in the lower stretch 19 of the conveyor, there is provided a backing plate 87 over which belt 73 rides and is thereby sustained rigid.

As the separated, filled capsules are advanced by their respective carriers into position over backing plate 87, the capsule closing pins gradually enter within the confines of the capsule body receiving apertures 25 and come to bear against the upper ends of the inverted capsule bodies. Progressively as the capsules are advanced by their respective carrier units 20, pins 85 enter further inwardly into apertures 25 to smoothly, gently, and very gradually push the bodies of the capsules fully into the caps as clearly shown in Fig. 11. Following such closing operation as the closed capsules advanced beyond the periphery of belt 73 where it passes over the leftmost roller 74 (Figs. 3 and 11), the filled, rejoined capsules descend by gravity into a suitable receptacle (not shown). The gradual incline of the lower stretches of chains 76, lying between sprockets 78 and 79, coupled with the inclined backing guide 83 insures a very gradual, positive but smooth closing action. The movement of traveling belt 73, together with the coordinate movement of closing pins 86, reduces to a minimum any drag or friction between the capsules and their respective receiving apertures and the closing pins and the sidewalls of the apertures. This materially aids in effecting a facile and gentle closing action and eliminates possibility of deformation or injury to the relatively fragile, dome-shaped ends of the capsule caps and bodies.

Figure 2:
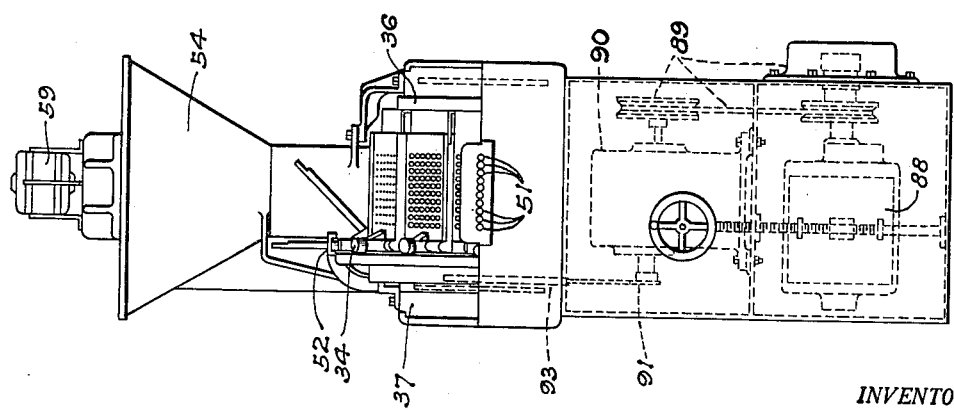
Fig. 2 is an end view thereof.

The machine drive, apart from motor 59 which has already been described, in conjunction with augers 56 and helicoid 62, includes a main motor 88 (Figs. 1 and 2) suitably mounted within pedestal 15. Suitable driving connections 89 connect motor 88 with a gear-reducing drive unit 90 also mounted in pedestal 15 above motor 88. The driven shaft 91 of unit 90 is connected by a chain 92 to a gear 93 affixed to the rear end of shaft 80 (see also Fig. 10). A relatively small sprocket 94 affixed to the forward end of shaft 80 is connected by a chain 95 to a sprocket 96 (Fig. 8) affixed to the forward end of shaft 44. The rearward end of shaft 44 has affixed thereon a sprocket 97 which is connected by a chain 98 with a sprocket 99 (see also Fig. 5), secured to the rear end of shaft 43. By these connections drums 45 and 45a, together with their associated sprockets 38 and 39, are continuously driven in rotation to advance the conveyor as previously described, and, simultaneously, the rotation of shaft 80 synchronously advances the capsule closing mechanism in the manner previously described.

The means for driving endless belt 64 comprises a relatively small sprocket 100 (Figs. 1 and 10) affixed to the forward end of shaft 80 adjacent sprocket 94 and connected by a chain 101 to a similar sprocket 102 affixed on the forward end of shaft 67 (see also Fig. 3).

While the form of mechanism herein shown and described is admirably adapted to fulfill the objects primarily stated, it is to be understood that it is not intended to confine the invention to the one form of embodiment herein disclosed for it is susceptible of embodiment in various forms, all coming within the scope of the claims which follow.

I claim:

1. In a capsule filling machine, a conveyor comprising spaced, upper and lower stretches formed of spaced pairs of inwardly facing channeled tracks; driven, toothed sprockets rotatably mounted at the opposite ends of and in alignment with said tracks and interconnecting said upper and lower stretches; a continuous series of disconnected, paired capsule cap and body carrier plates; each of said pairs of plates being mounted in superposed closed relation and hinged together at one end thereof; each body-carrier plate having paired, spaced, rollers projecting from its opposed ends into the channels of said tracks and engageable by the teeth of said sprockets; portions of said rollers being arranged to tangentially engage corresponding portions of the rollers of the next adjacent body-carrying plate to thereby impart advancing movement thereto; each cap-carrying plate having a cam roller associated therewith adjacent its hinged end; a cam track spacedly surrounding said upper and lower stretches and the sprocketed ends of said conveyor in the plane of said cam rollers; said cam track being adapted to engage said cam rollers and move said cap-carrier plates arcuately about their hinged connections, seriatim, upwardly and away from their respective body-carrying plates into open position and reversely back into superposed closed position at predetermined times during the progressive advance of said plates along the upper stretch of said conveyor.

2. In a capsule filling machine, the combination with a capsule filling material container having a discharge opening, of a pair of upper and lower plates hingedly connected together at one end with said upper plate normally disposed in superposed relation upon said lower plate, said upper and lower plates each having a series of axially aligned capsule cap and body-receiving apertures, respectively, said lower plate being adapted to be moved under said discharge opening, means for discharging capsules into said apertures in such a manner as to cause their caps to be disjoined from their bodies concurrently upon said capsules and bodies entering into their respective receiving apertures, and means for arcuately swinging said upper plate upwardly about said hinged connection during the time said lower plate passes beneath said discharge opening.

3. In a capsule filling machine, a driven conveyor having upper and lower stretches comprising an endless series of disconnected capsule-part receiving units arranged to be continuously and progressively advanced one by the other along an endless path formed of channeled track members, driven sprockets associated with the opposed ends of said track members adapted to engage and impart movement to said units and to progressively transfer said units from said upper stretch to said lower stretch, each of said units comprising an upper plate mounted in superposed relation upon a lower plate, both of said plates being hingedly connected together at one end thereof, aligned apertures in said upper and lower plates for receiving capsule caps and capsule bodies, respectively; means for discharging uprighted capsules into said apertures and for simultaneously separating said caps from said bodies as they are received in their respective apertures, a container for filling material located along said upper stretch and having a discharge orifice disposed in communicating relation with said body-receiving apertures, and cam means associated with said upper plates adapted to rock said upper plates, seriatim, arcuately upwardly about their hinges as said units progressively approach said nozzle and subsequently lower said plates arcuately back into superposed relation upon said lower plates following the passage of the latter from beneath said discharge orifice.

4. In a capsule filling machine, capsule disjoining means including a series of disconnected, paired, hinged-together upper and lower plates each having a series of aligned apertures for receiving capsule caps and capsule bodies, respectively; said plates being arranged to be guidedly moved, one by the other, continuously around an endless track conveyor; means including a discharge nozzle registering with the upper surfaces of said lower plates for delivering filling material into said bodies; vertically adjustable, driven, endless belt means disposed directly beneath the lower surfaces of said lower plates for supporting said capsule bodies as they pass under said nozzle; and a means for moving said upper plates arcuately upwardly away from said lower plates before the latter pass under said discharge nozzle and then arcuately downwardly following their passage thereunder.

5. In a capsule filling machine, capsule disjoining mechanism including two plates one superposed upon the other and both hinged together at one end thereof, shouldered apertures in said upper plate for receiving capsule caps, apertures in said lower plate for receiving capsule bodies, said upper and lower plate apertures being normally axially aligned when said plates are in superposed relation, and cam operated means associated with said hinged end of said upper plate operable to move said plate arcuately upwardly to remove the capsule caps completely out of the plane of the capsule bodies.

6. In a capsule filling machine, the combination with means for delivering capsules in an upright position with their caps uppermost, of capsule disjoining mechanism including a pair of upper and lower plates arranged in close superposed relation and hingedly connected together at one end thereof, a series of apertures in said upper plate formed to receive and retain capsule caps, a corresponding aligned series of apertures in said lower plate for receiving capsule bodies, suction means for withdrawing said bodies from said caps, and means associated with said upper plate for moving it arcuately upwardly from said lower plate a distance sufficient to fully expose all of the upper open ends of said bodies contained in said lower plate.

7. In a capsule filling machine, a conveyor comprised of a series of hinged-together upper and lower plate capsule-part carriers, spaced upper and lower stretch tracks for guidedly supporting said carriers, driven sprockets associated with the ends of said tracks for interconnecting said upper and lower stretches, said sprockets being adapted to engage and impart movement to each carrier as it comes into association therewith, each carrier being adapted to impart movement to that carrier next adjoining it, a series of aligned apertures in each of said upper and lower plates for receiving capsule caps and bodies, respectively; means for discharging assembled capsules into said apertures, means for effecting separation of said caps from said bodies, means for filling said bodies, a second driven conveyor means disposed between the upper and lower stretches of said first conveyor and driven in timed relation therewith, said second conveyor comprising a series of outwardly projecting plungers traversing an inclined path and arranged to progressively enter within said body-receiving apertures and gradually rejoin said bodies with said caps following the filling of said bodies and subsequently to eject said rejoined, filled capsules from said apertures.

8. A capsule cap and body carrier unit for a capsule filling machine, comprising a horizontally disposed lower plate member having a series of apertures therein for receiving capsule bodies, an upper plate member having a corresponding series of apertures axially aligned with said body-receiving apertures for receiving capsule caps, said upper plate member being hingedly mounted at one end in superposed relation to the corresponding end of said lower plate member and adapted to be moved in an arcuate path upwardly about said hinged connection from its normal position superadjacent said lower plate member to a position substantially at normal to said lower plate member to permit free and easy access to capsule cap and body parts contained respectively in the capsule cap and body apertures of said plates, a cam operated means associated with said upper plate member adjacent a hinged end thereof operable to impart said arcuate movement thereto during the advance of said plates in said filling machine.

9. A capsule cap and body carrier unit according to claim 8 wherein said lower plate member has spaced outwardly projecting rollers at its opposite ends with the peripheries of at least portions of said rollers marginally overextending the planes of the opposite sides of said lower plate member for tangential engagement with similar portions of similar rollers on the lower plate member of a next-adjacent carrier unit.

References Cited in the file of this patent

UNITED STATES PATENTS

| | | |
|---|---|---|
| 1,155,023 | Winchester | Sept. 28, 1915 |
| 1,876,813 | Wilkie et al. | Sept. 13, 1932 |
| 2,412,637 | Smith | Dec. 17, 1946 |